United States Patent

Menze, sen.

[11] Patent Number: 5,660,406
[45] Date of Patent: Aug. 26, 1997

[54] SPRUNG STEERING SYSTEM FRONT STRUCTURE FOR BICYCLES

[76] Inventor: Heinrich Menze, sen., Selbecker Strasse 288, D 58091 Hagen, Germany

[21] Appl. No.: 521,739

[22] Filed: Aug. 31, 1995

[30] Foreign Application Priority Data

Sep. 21, 1994 [EP] European Pat. Off. .............. 94250230

[51] Int. Cl.$^6$ ........................................... B62K 21/14
[52] U.S. Cl. ......................... 280/276; 280/280; 74/551.2; 74/551.3
[58] Field of Search ...................... 280/276, 279, 280/280; 74/551.2, 551.3, 551.1

[56] References Cited

U.S. PATENT DOCUMENTS

| | | |
|---|---|---|
| 4,939,950 | 7/1990 | Girvin . |
| 5,181,436 | 1/1993 | Lai . |
| 5,186,074 | 2/1993 | Arnold ................................ 74/551.2 |
| 5,241,881 | 9/1993 | Chen . |
| 5,253,544 | 10/1993 | Allsop et al. ......................... 74/551.2 |
| 5,285,697 | 2/1994 | Clausen ................................ 74/551.2 |
| 5,405,159 | 4/1995 | Klein et al. ............................. 280/283 |
| 5,511,444 | 4/1996 | Clausen et al. ......................... 280/276 |

FOREIGN PATENT DOCUMENTS

| | | |
|---|---|---|
| 2 234 176 | 7/1993 | France . |
| 9215744 | 6/1993 | Germany . |
| 93 06 261 | 8/1993 | Germany . |

*Primary Examiner*—Brian L. Johnson
*Assistant Examiner*—Gary Savitt
*Attorney, Agent, or Firm*—Banner & Witcoff, Ltd.

[57] ABSTRACT

A sprung steering system front structure, particularly for bicycles. The sprung steering front structure comprises a spring mechanism (11) with a rubber torsion spring, which between the front structure shaft (22) for the handle-bar and the upper end (3) of the shaft tube (1) is fixed in a fork (4) by means of a screw (15) passing through the fork legs (5, 6). The steering system front structure additionally has an angular position setting of the front structure shaft (22) with respect to the shaft tube (1) and an adjustability of the spring tension.

4 Claims, 2 Drawing Sheets

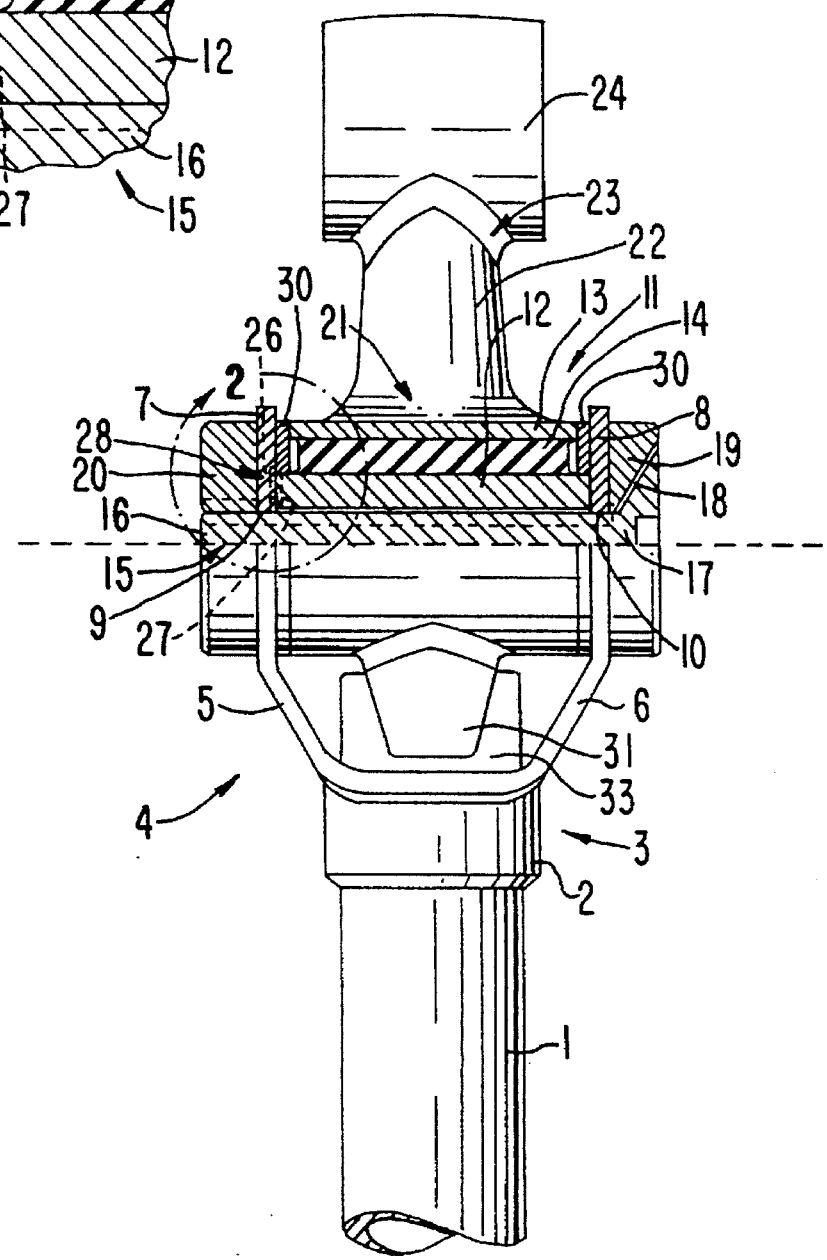

SPRUNG STEERING SYSTEM FRONT STRUCTURE FOR BICYCLES

BACKGROUND OF THE INVENTION

The invention relates to a sprung steering system front structure for bicycles having a shaft tube with an upper end and a front structure shaft mounted so as to rotate about a rotation axis at the upper end of the shaft tube, with a receiving ring for the handle-bar, a shock absorbing spring mechanism being provided between the shaft tube and the front structure shaft.

In order to avoid the transmission of impacts or shocks acting on the front wheel to the steering system numerous different spring and shock absorbing systems are already known, such as e.g. telescopic spring systems, but they are fault-prone and in particular not maintenance-free, whilst being expensive to manufacture and fit.

A spring steering system front structure of the aforementioned type can e.g. be gathered from the Journal RAD-FAHREN 4/94. In said known steering system front structure below the pivot bearing of the front structure shaft and namely on the shaft tube there is a spring element comprising a PU-ring acting as a rigid elastomer buffer. Impacts transferred to the shaft tube are absorbed by compression on the rigid elastomer buffer, on which is supported a pressure piece fixed to the lower end of the front structure shaft. By means of elastomeric PU-rings as the buffer element only a vibration damping, but not a spring suspension can be obtained. Thus, the maximum spring deflection, when only using elastomer elements with a very low degree of hardness, is 1.8 cm. Therefore the known spring steering system front structure with a soft elastomer element can be used for damping vibrations, whose transmission from the frame via the shaft tube to the front structure shaft is to be avoided. However, with the known means a spring suspension cannot be obtained.

The problem is therefore to provide a spring steering system front structure of the aforementioned type permitting the obtaining of an effective spring cushioning of road impacts and which also allows an easy adjustment of the spring tension.

SUMMARY OF THE INVENTION

According to the invention this problem is solved in that the spring mechanism is a rubber torsion spring with a rubber element, which is vulcanized in between an outer metal casing and an inner metal sleeve, the shaft tube has at the upper end a fork, in which is fixed the spring mechanism by means of a screw passing through the fork legs, so that the inner metal sleeve is fixed to the fork and the outer metal casing to the front structure shaft, the inner faces of the fork legs and the front faces of the inner metal sleeve are serrated for a reciprocal engagement and form a tooth system, on the outer metal casing is provided a stop web for a setscrew, which is located oh the fork, the outer metal casing and the inner metal sleeve are elastically rotatable against one another about an angle for shock absorption in the case of a force action under torsional stressing of the rubber element, so that following the loosening of the screw a varyingly high pretension can be set by swinging up the front structure shaft with an angular rotation of the tooth system, in which after retightening the screw and forcing back the front structure shaft against the spring tension of the rotating rubber element, the setscrew is screwed against the stop web of the metal casing and in this way the desired pretension is stored, with an increase in the pretension the spring tension of the steering system front structure correspondingly increases and by loosening or tightening the setscrew the angle between the shaft tube and the front structure shaft can be individually varied.

In the spring mechanism, the invention makes use of a proven rubber torsion spring with which not only an optimum spring cushioning of impacts, but also the pivot bearing between the shaft tube and front structure shaft is brought about and for which in the known means it is necessary to have two juxtaposed devices, namely a pivot bearing and a shock absorbing device alongside it.

The invention allows an easy manufacture and a constructionally simple arrangement of the rubber torsion spring between the shaft tube and the front structure shaft in that the rubber torsion spring is fixed in simple manner by means of a screw in a fork at the upper end of the shaft tube. The inner metal sleeve of the rubber torsion spring is detachably fixed by the screw to the fork legs. The front structure shaft is fixed to the outer metal casing of the spring, so that the torsionally stressable ring-like or sleeve-like rubber element acts as an effective spring suspension between the shaft tube and the front structure shaft.

In a normal construction the invention allows a spring deflection of up to 4 cm with a rubber torsion spring in conventional technology. Thus, the rubber torsion spring not only absorbs vibrations, but also high shock loads, which are consequently kept away from the front structure shaft and the bicycle steering system.

The construction of the steering system front structure according to the invention simultaneously allows an axially precise guidance of the front structure shaft in the pivot bearing means connected to the rubber torsion spring, so that the front structure shaft and the steering system only perform movements in a vertical plane on springing in With respect to the front structure shaft.

A very important advantage of the invention is that a pretension of the rubber torsion spring can be adjusted in simple manner in that the metal casing and the inner metal sleeve of the spring are elastically rotated against one another by an angle and can be fixed in the desired rotation angle position relative to one another. For this purpose there is a simple fastening of the inner metal sleeve by means of a screw passing through said sleeve on the lugs of the fork legs in which is held and mounted the rubber torsion spring. The mutually engaging inner faces of the fork legs pressed against one another by the screw fastening on the one hand and the front faces of the inner metal sleeve on the other are in each case serrated. The in each case desired rotation angle position of the outer metal casing and the inner metal sleeve is adjusted and fixed by said tooth system. For this purpose it is merely necessary to loosen the screw, swing up the front structure shaft, so that there is an angular rotation of the serrated surfaces and then the screw is retightened and the front structure shaft is forced back counter to the spring tension of the now torsionally stressed rubber element until the inventively provided setscrew is again screwed down against the stop web of the outer metal casing and in this way the desired pretension is stored.

A particular advantage of the invention is the angular adjustability of the front structure shaft with respect to the shaft tube, which is brought about by loosening or tightening the setscrew, which engages on the stop web. Simultaneously the setscrew also allows a fine setting of the pretension.

A special feature of the invention is that the adjustability of the spring tension is obtained by setting the necessary or desired pretension without replacing parts.

Advantageous further developments of the solution according to the invention are defined in the subclaims.

DESCRIPTION OF THE DRAWINGS

An embodiment of the invention is described in greater detail hereinafter relative to the drawings, wherein show:

FIG. 1 A front view of a sprung steering system front structure, in part in sectional form.

FIG. 2 A larger scale representation of a detail of FIG. 1 in section.

DETAILED DESCRIPTION OF THE EMBODIMENT

Figure 3:
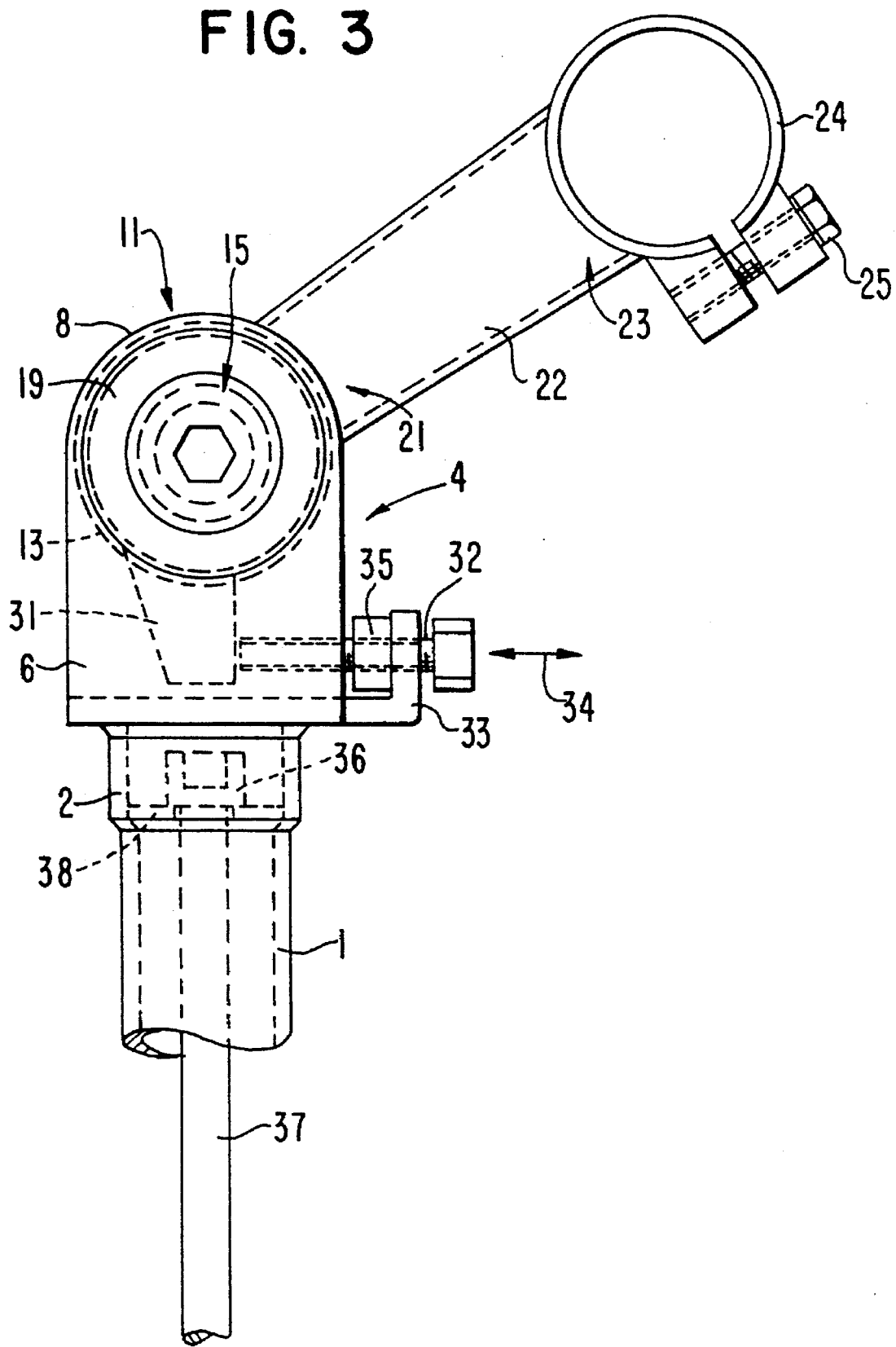
FIG. 3 A side view of the steering system front structure according to FIGS. 1 and 2.

In the steering system front structure shown in FIG. 1 at the upper end 3 of a shaft tube 1 is provided a widening 2. A fork 4 is fixed to the widening 2. Parallel fork legs 5 and 6 are constructed at their free ends as lugs 7, 8. Lugs 7 and 8 utilize central bores 9 and 10.

In the fork 4 is held and mounted a spring mechanism 11, here constructed as a rubber torsion spring. The spring mechanism 11 comprises an inner metal sleeve 12 and an outer metal casing 13, between which is vulcanized in a rubber element 14, i.e. is permanently fixed on the faces of the inner metal sleeve 12 and the outer metal casing 13 adjacent to the rubber element 14.

The inner metal sleeve 12 is held in a position centered with respect to the lugs 7, 8 of the fork legs 5, 6 by a screw 15, which extends with a threaded shank 16 through the gap of the inner metal sleeve 12 and through the bores 9, 10 in the lugs 7, 8 of the fork legs 5, 6. On the right-hand side of the screw 15 with respect to the drawing said screw engages with a conical head 17, which has a hexagonal recess, on a central conical surface 18 of a disk 19, by means of which the screw head is pressed against the outside of the lug 8 of the fork legs 6. On the left-hand side of the drawing nut 20 is screwed. The nut 20 is for fastening the screw 15 into the threaded shank 16 to such an extent that the nut 20 engages firmly on the outside of the lug 7 of the fork leg 5. Consequently, the unit formed from the screw 15 and the inner metal sleeve 12, as well as the disk 19 and the nut 20 is securely fixed to the fork legs 5, 6.

The lower end 21 of the front structure shaft 22 (cf. also FIG. 3) is fixed, preferably by a welded connection to the outer metal casing 13. On the upper end 23 of the front structure shaft 22 is provided a receiving ring 24 (for the not shown steering system) which is clamp-fixed by means of a ring with a screw 25.

As is in particular shown in FIG. 2, on the front faces 26 (for ease of viewing the reference numerals are only shown in the left-hand part of FIG. 1, as well as in FIG. 2) of the inner metal sleeve 12 and on the inner faces 27 of the lugs 7, 8 of the fork less 5, 6 are provided radially serrated surfaces, which are intended for a mutual engagement and form a tooth system 28.

Between the front faces 29 of the outer metal casing 13 and the opposite inner faces of the lugs 7, 8 of the fork legs 5, 6, to the extent that they are not serrated, on both sides is provided as a bearing ring a plastic disk 30 which gives the outer metal casing 13 on the one hand a lateral guidance, but on the other allows a rotation of the outer metal casing 13.

With respect to the underside of the outer metal casing 13 projects a stop web 31 for a setscrew 32 held on the fork side,in the manner shown in the drawing with the angular fastening 33 shown in FIG. 3 and can be loosened or tightened in the latter, as is indicated by the arrow 34. The lock nut 35 fixes the setscrew 32 in the in each case desired position on the angular fastening 33.

In the widening 2 is provided a central opening in which is supported the head 36 of the shaft screw 37 with the aid of a washer 38. For this purpose the bottom of the fork 4 is centrally provided with an opening for inserting the shaft screw 37.

As a result of the above-described construction of the steering system front structure according to the invention, road impacts or shocks transferred from the front wheel to the handle-bar are reliably spring-cushioned in the spring mechanism 11, because the rubber element 14 allows an elastic rotation of the inner metal sleeve 12 with respect to the outer metal casing 13.

The represented and described construction simultaneously allows the setting of a pretension on the spring mechanism 11. For this purpose the nut 20 of the screw 15 is loosened until the tooth system 28 on the front faces 26 and inner faces 27 allows an angular rotation, so that the front structure shaft 22 can be swung up and the serrated front faces 26 and inner faces 27 assume a new angular position, in which they are once again engaged and by tightening the nut 20 and therefore clamping the screw 15 are so pressed against one another that no sliding through of said faces is possible in the case of torsional stressing. The front structure shaft 22 is then again forced back against the spring tension of the elastically rotating rubber element 14, which is consequently increasingly under torsional stress, until the setscrew 32 can again be engaged with the stop web 31 in order to retain the front structure shaft 22 in this angular position and store the pretension attained. The setscrew 32 can also be used for carrying out a fine setting. The set-screw 32 enables the angular position of the front structure shaft 22 relative to the shaft tube 1 to be modified.

What is claimed is:

1. A sprung steering system front structure for bicycles, comprising:

a shaft tube with an upper end;

a front structure shaft rotatably mounted about a rotation axis at the upper end of the shaft tube; and a receiving ring for a handle-bar mounted on the front structure shaft;

and a shock absorbing spring mechanism mounted between the shaft tube and front structure shaft;

wherein:

the spring mechanism is a rubber torsion spring with a rubber element which is vulcanized in between an outer metal casing and an inner metal sleeve;

the shaft tube has at its upper end a fork, the spring mechanism being fixed within said fork by an adjustable screw passing through the fork legs so that the inner metal sleeve is fixed to the fork and the outer metal casing is fixed to the front structure shaft;

inner faces of the fork legs and front faces of the inner metal sleeve are serrated for engagement with each other to thereby form a tooth system;

a stop web is provided on the outer metal casing for abutting with a setscrew which is located on the fork; and the outer metal casing and the inner metal sleeve are elastically rotatable relative to one another through an angle, under torsional stressing of the rubber element, for shock absorption in the case of a force action, whereby adjustment of said adjustable screw can provide a variable prestressing of the rubber element through upward swinging of the front structure shaft to cause an angular rotation of the tooth system, whereby further adjustment of the adjustable screw and movement of the front structure shaft against spring tension of the rubber element, and advancement of the setscrew against the stop web of the metal casing can complete prestress adjustment;

an increase in the prestressing of the rubber element will cause a corresponding increase in tension of the steering system front structure, and by adjustment of the setscrew, the angle between the shaft tube and the front structure shaft can be varied.

2. A sprung steering system front structure for bicycles according to claim 1, wherein the shaft tube is provided below the fork with an enlarged potion, in which is supported, with the aid of a washer, a head of a shaft screw.

3. A sprung steering system front structure for bicycles according to claim 2, wherein a bottom side of the fork is provided with a central opening for receiving therein the shaft screw.

4. A sprung steering system front structure for bicycles according to one of the claims 1, 2 or 3 wherein the spring mechanism within the fork is supported on either side by respective plastic disks.

* * * * *